United States Patent [19]

Kim et al.

[11] Patent Number: 4,707,583

[45] Date of Patent: Nov. 17, 1987

[54] PLASMA HEATED SINTERING FURNACE

[75] Inventors: Jonathan J. Kim, Williamsville; Viswanathan Venkateswaran, Grand Island, both of N.Y.

[73] Assignee: Kennecott Corporation, Cleveland, Ohio

[21] Appl. No.: 718,376

[22] Filed: Apr. 1, 1985

Related U.S. Application Data

[63] Continuation-in-part of Ser. No. 533,596, Sep. 19, 1983, Pat. No. 4,559,312.

[51] Int. Cl.$^4$ ................................................. B23K 9/00
[52] U.S. Cl. ........................ 219/121 P; 219/121 PQ; 373/18; 373/24
[58] Field of Search ...... 219/121 P, 121 PR, 121 PM, 219/121 PQ, 121 PN, 359, 383; 373/18, 19, 24, 25, 22; 315/111.21, 111.31

[56] References Cited

U.S. PATENT DOCUMENTS

| | | | |
|---|---|---|---|
| 3,432,296 | 3/1969 | McKinnon et al. | 373/18 |
| 3,935,371 | 1/1976 | Camacho et al. | 373/18 |
| 3,970,290 | 7/1976 | Santen et al. | 373/18 |
| 4,179,299 | 12/1979 | Coppola et al. | 106/44 |
| 4,390,773 | 6/1983 | Esser et al. | 219/121 P |
| 4,462,792 | 7/1984 | Roth et al. | 373/18 |

FOREIGN PATENT DOCUMENTS 0032100 12/1980 European Pat. Off. .
2510986 8/1982 France .

*Primary Examiner*—M. H. Paschall
*Attorney, Agent, or Firm*—Lorusso & Loud

[57] ABSTRACT

A furnace for the sintering of refractory or ceramic materials using plasma heated gases. The furnace comprises a sintering chamber with strategic positioning of the plasma torch inlets and exhaust outlet, a furnace temperature controlling device during sintering so that the article being sintered does not decompose. The devices which can be used for controlling the temperature of the furnace during sintering include: (1) Tangential injection of a secondary colder gas stream into the hot primary plasma gas stream; (2) Utilization of a plasma torch or torches which can be temperature controlled to achieve stable and lower plasma gas temperatures; and (3) Introduction of a secondary cooler gas directly into the furnace sintering chamber.

4 Claims, 6 Drawing Figures

PLASMA HEATED SINTERING FURNACE

CROSS-REFERENCE TO RELATED APPLICATIONS

This application is a continuation-in-part application of U.S. patent application Ser. No. 533,596, filed Sept. 19, 1983 now U.S. Pat. No. 4,559,312, entitled "A Sintering or Reaction Sintering Process for Ceramic or Refractory Materials Using Plasma Arc Gases," the teachings of which are incorporated herein by reference.

BACKGROUND OF THE INVENTION

This invention relates to a furnace and method for the sintering of refractory and ceramic materials using plasma heated gases.

Prior art sintering furnaces, in general, tend to be inefficient and slow. Long furnace retention times are necessary when using conventional sintering furnaces, which results in poor energy utilization, excessive furnace gas consumption and high maintenance costs.

Many ceramic or refractory materials are sintered in prior art tunnel or periodic kilns which are fired by energy released from the combustion of fossil fuels with air or oxygen. If the ceramic or refractory material can be exposed to air and/or the products of combustion, then the kiln may be directly fired, in which case, the heating and utilization of energy may be reasonably efficient. However, for certain refractory materials, such as the carbides, nitrides and borides, the firing must be done in the absence of oxygen or oxygen-bearing gases, including water and carbon dioxide, to prevent formation of oxides, which may result in products having undesirable physical and chemical properties. Under such conditions, fossil fuel-fired furnaces may be used but the ceramic or refractory materials must be kept in a controlled environment, such as a retort, isolated from the combustion products of the fuel. Such heating is indirect, inefficient and slow. On a commercial scale, an apparatus such as a tunnel kiln requires about 70–90 hours (including the cooling cycle) to sinter refractory or ceramic articles.

Prior art electric kilns are also used to sinter ceramic or refractory materials under controlled atmospheres, but again tend to be energy inefficient and slow. In the case of a kiln equipped with graphite heating elements, the voltage can be controlled and the kiln can be heated to fairly high temperatures, yet there are several disadvantages: (1) The heating elements have a limited size, complex shape and must be kept under a strictly controlled atmosphere to maintain a long life; and (2) Furnace size is limited and it is difficult to achieve a uniform temperature in this type of kiln because the heating elements provide only radiant heat. Because of radiant heat transfer, as well as a heat element size limit, the kiln has a poor load density, a limited productivity and a poor energy efficiency. A typical sintering cycle time using a prior art electric kiln is around 24 hours (including cooling).

Plasma arc technology has recently been applied to the production of refractory and ceramic materials to reduce the furnace energy requirements and retention times. Plasma sintering of refractory and ceramic materials results in higher density and superior strength products than those made by conventional processes.

Plasma arc fired gases differ greatly from ordinary furnace heated gases in that they become ionized and contain electrically charged particles capable of transferring electricity and heat; or, as in the case of nitrogen, become dissociated and highly reactive. For example, nitrogen plasma gas dissociates into a highly reactive mixture of $N_2$-molecules, N-atoms, $N^+$-ions and electrons. This dissociation or ionization greatly increases the reaction rates for sintering ceramic or refractory materials. Nitrogen, for example, which dissociates at around 5000° C. and 1 atmosphere pressure, would not dissociate under the normal furnace sintering conditions of around 1500° C.–2000° C. Thus, the use of plasma gases results in a highly reactive environment, which greatly increases the reaction sintering rate.

Plasma arc technology has generally only been used for the fusion of high temperature materials and not for sintering or reaction sintering. This is because the required sintering temperature for most ceramic or refractory materials is usually less than 2500° C., whereas the average temperature of gases heated with a plasma arc torch is above 4000° C. At such high temperatures, the refractory or ceramic materials may decompose. However, a plasma gas can be superheated to effect ionization or dissociation, while the ceramic or refractory material is then directly heated by this preheated gas to a much lower temperature. For example, nitrogen plasma gas heated to around 3000° C. will bring silicon carbide refractory articles up to a temperature of 1000° C.–1600° C. in two to eight hours; and nitrogen plasma gas heated to around 4000° C. will bring the articles up to a temperature of 1900° C.–2200° C. in the same time period. Thus, a plasma gas may be heated to a much higher temperature than the sintering temperature required.

SUMMARY OF THE INVENTION

This invention relates to an efficient furnace and method for the sintering of refractory or ceramic materials using plasma heated gases.

The furnace of the invention comprises a sintering chamber, at least one plasma torch inlet, an exhaust outlet, and means for controlling the furnace temperature during sintering so that the article being sintered does not decompose. Preferably, the furnace contains at least two plasma torch inlets, positioned asymmetrically through the walls of the sintering chamber. Asymmetric positioning of the plasma torch inlets can be achieved by locating the inlets on adjacent or opposite walls of the sintering chamber to create a uniform temperature distribution. If the furnace contains only one plasma torch inlet, the inlet should be positioned near the top of the sintering chamber to maximize convective turbulence created by the plasma heated gases. If there are two or more plasma torch inlets, at least one inlet should be positioned near the top of the sintering chamber, and at least one inlet should be positioned near the center of the sintering chamber. Preferably, the exhaust outlet is located near the bottom of the sintering chamber in order to increase the plasma gas retention time, as well as increase the thermal convective turbulence.

In a preferred embodiment, the furnace is cylindrical shaped, with a rectangular shaped inner sintering chamber. In another embodiment of the invention, the sintering chamber is cylindrical shaped. The furnace mass should be low to accomodate a high heating rate. The sintering chamber is surrounded by insulation, preferably formed from carbon or graphite as felt or Fiberform ®. Thick insulation is not necessary when fast heating rates are utilized for sintering, since the cycle times are shortened. The exterior of the furnace comprises a structural material such as stainless steel. Preferably, there is a water cooled jacket layer between the insulative layers and the outer structural shell. The furnace may be opened from the bottom, sides or top.

The furnace of the present invention is useful for sintering refractory or ceramic articles in a temperature controlled plasma environment. There are three means in the furnace of the invention for controlling the furnace sintering temperature so that the ceramic or refractory material does not decompose. The first means comprises tangential injection of a secondary colder gas stream into the primary plasma gas stream as disclosed in U.S. patent application Ser. No. 533,596. The combined gas stream is fired into the sintering chamber through the plasma gas inlet(s). Tangential injection of the secondary gas stream creates a swirl effect wherein the cold gas envelops the hot plasma gas. The second means comprises the use of a plasma torch which can achieve highly stable and lower plasma gas temperatures. One such plasma torch is manaufactured by Plasma Materials, Inc. (PMI). A further means comprises directly introducing a secondary gas stream into the sintering chamber. Waste heat can be introduced as the secondary gas stream to improve the energy efficiency and to control the furnace temperature.

Use of the furnace of the present invention for sintering ceramic or refractory materials results in a high furnace productivity, a higher energy efficiency, and uniform furnace temperatures.

Accordingly, it is an object of the present invention to provide a plasma heated furnace which can be effectively controlled for the sintering of ceramic or refractory materials.

It is a further object of the present invention to provide a furnace for sintering ceramic or refractory materials which achieves a high furnace productivity, a uniform temperature distribution in the sintering chamber, and a significant reduction of the retention time required for sintering.

Another object of the present invention is to provide a sintering furnace for ceramic or refractory materials which must be sintered in a controlled gaseous environment.

It is yet a further object of the present invention to provide a furnace for the sintering of ceramic or refractory materials which is efficient and produces consistent, uniform and superior quality products.

Other objects and further scope of applicability of the present invention will become apparent from the detailed description to follow, taken in conjunction with the accompanying drawing.

DESCRIPTION OF THE PREFERRED EMBODIMENT

Figure 1:
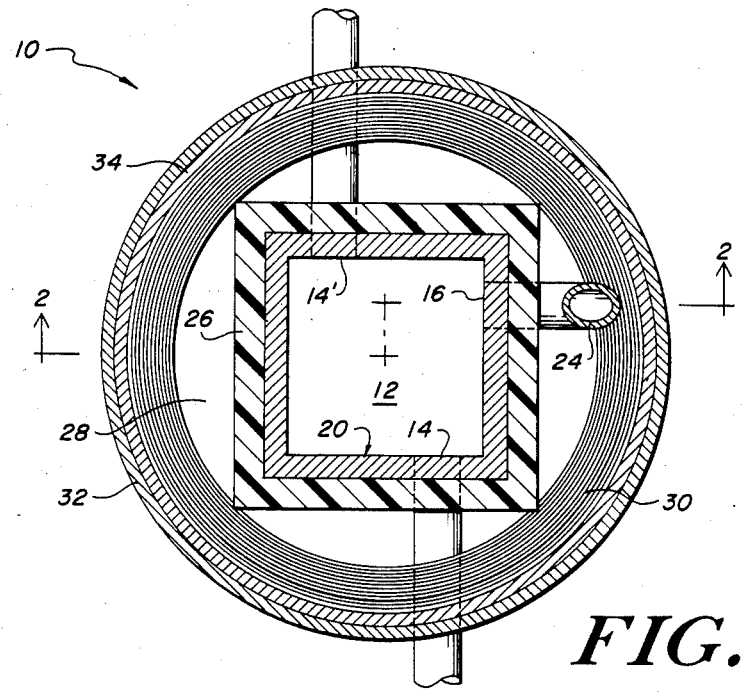
FIG. 1 is a cross-sectional top view of a preferred embodiment of the furnace of the invention.

This invention may be used to a great advantage in practicing the process set forth in U.S. patent application Ser. No. 533,596, filed Sept. 19, 1983, entitled A SINTERING OR REACTION SINTERING PROCESS FOR CERAMIC OR REFRACTORY MATERIALS USING PLASMA ARC GASES, the teachings of which are incorporated herein by reference.

The furnace of the present invention is also useful in practicing the inventions of copending patent applications, Ser. No. 718,375 entitled PLASMA ARC SINTERING OF SILICON CARBIDE, to Jonathan J. Kim et al, and Ser. No. 718,374 entitled SYSTEM FOR PREVENTING DECOMPOSITION OF SILICON CARBIDE ARTICLES DURING SINTERING, to Joel D. Katz et al, filed on even date herewith, the teachings of which are incorporated herein by reference. Attorney's Docket No. 85-P-0119 discloses a process for the sintering of silicon carbide refractory or ceramic articles in a plasma heated furnace, wherein the silicon carbide article is heated by a plasma gas having an energy capacity of 2000 BTU/lb–6000 BTU/lb to a sintering temperature of between 1500° C.–2500° C., at a heating rate of 300° C./hr–2000° C./hr, and held at the sintering temperature for 0.1–2 hours, yielding a total cycle time (including cooling and loading) of 1.5 to 20 hours and preferably around seven hours. This compares to a total cycle time of around 24 hours for an electric kiln. It should be noted that in such prior art electric kilns, such as a Centorr ™ or Astro ™ furnace, the only mode of heat transfer is through radiation. Attorney's Docket No. 84-P-0687 discloses a process for the sintering of silicon carbide refractory or ceramic articles in a plasma heated furnace, wherein decomposition of the silicon carbide article is prevented by the use of covered crucibles, strategic placement of the plasma torches and exhaust outlet, and/or the use of a "sacrificial" body of silicon carbide which decomposes before the silicon carbide article being sintered.

At the outset, the invention is described in its broadest overall aspects with a more detailed description following. This invention relates to a furnace for sintering refractory or ceramic materials using plasma heated gases. The furnace of the invention comprises a sintering chamber, with strategic positioning of at least one plasma torch inlet and exhaust outlet, and means for controlling the furnace temperature during sintering so that the articles being sintered do not decompose. Preferably, the furnace contains at least two plasma torch inlets, positioned asymmetrically through the walls of the sintering chamber. Preferably, the exhaust outlet is located below the plasma torch inlets to increase the plasma gas retention time and thermal convective turbulence.

The furnace of the invention for sintering refractory or ceramic articles includes three separate means for controlling the furnace sintering temperature: (1) Tangential injection of a secondary colder gas stream into the primary gas stream, with the combined gas stream being injected through the plasma gas inlet(s) into the sintering chamber; (2) Use of a plasma torch which can achieve very stable and lower plasma gas temperatures; and (3) Directly introducing a secondary gas stream into the sintering chamber. This third means may be used, separately, or in conjunction with one of the first two means for controlling the furnace temperature.

Figure 2:
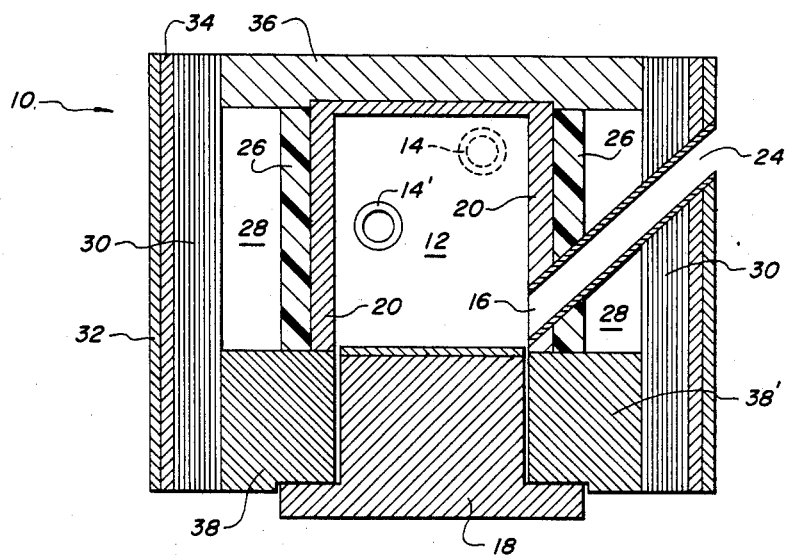
FIG. 2 is a cross-sectional side view of the furnace of the invention taken along the line A—A' of FIG. 1.

FIGS. 1 and 2 of the drawing show cross-sectional top and side views of a preferred furnace design of the present invention. The furnace 10 contains a sintering chamber 12, having two plasma torch inlets 14 and 14′, an exhaust outlet 16 and a furnace door bottom 18. The sintering chamber 12, shown in FIGS. 1 and 2, is rectangular-box shaped, although it could also be cylindrical shaped. The sintering chamber 12 is lined with graphite plate 20. The exhaust outlet 16 is also lined with a material such as graphite 24. An insulative layer 26, such as Fiberform ® insulation material, surrounds the sintering chamber 12 in a rectangular shape. Insulative graphite felt layers 28 and 30 further surround the sintering chamber. Thick insulation is not required when high heating rates are utilized, such as disclosed in U.S. patent application Ser. No. 06/718,375 (Attorney's Docket No. 85-P-0119), since the total cycle time is less than 20 hours and preferably around seven hours. The furnace should have a light mass when high heating rates are utilized. A structural shell 32, such as stainless steel, forms the outer structure of the furnace. Between the outer structural shell 32 and the ring layer 30 is a water cooled jacket layer 34. The furnace top 36, bottom 38, 38′ and door 18 are made from insulative materials such as graphite Fiberform ®. There is also water cooling of the top and bottom steel plates of the furnace (not shown).

Figure 6:
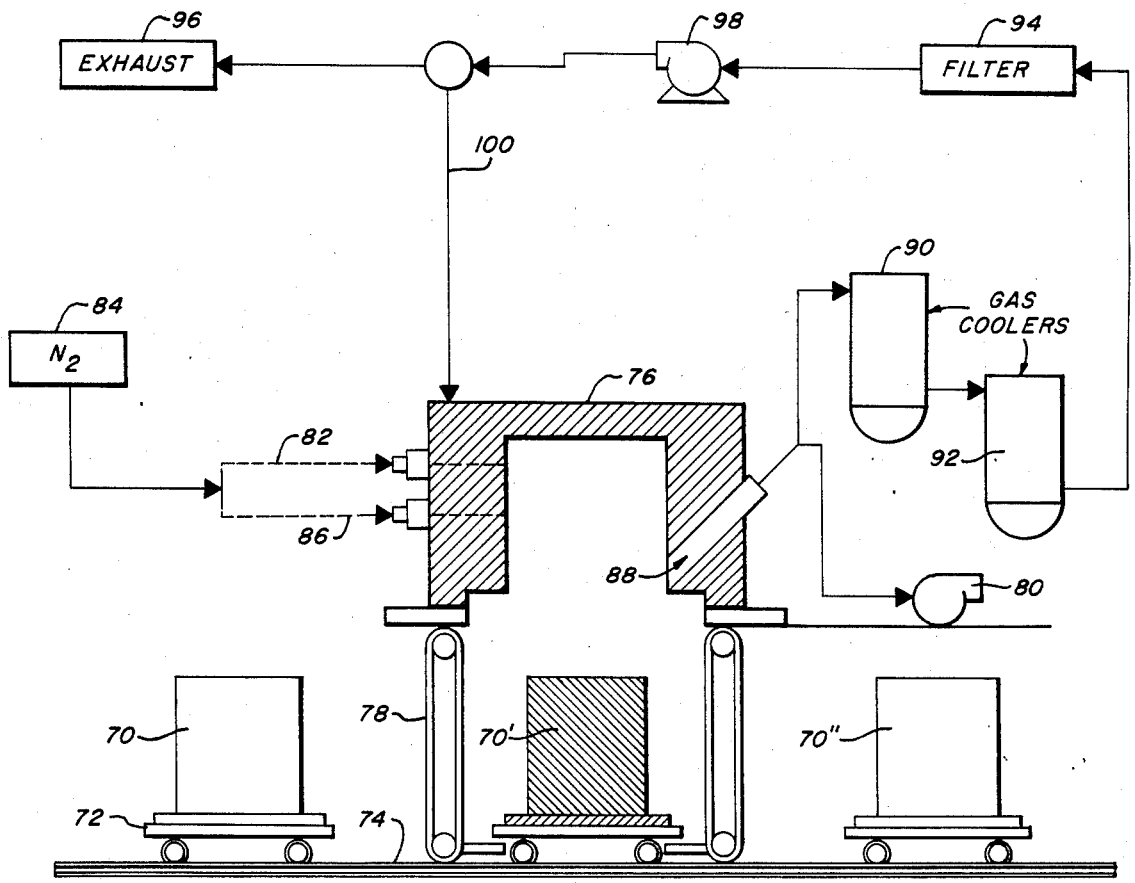

FIG. 2 of the drawing shows the positioning of the furnace door 18 on the bottom of the furnace so that the furnace charge may be loaded and unloaded easily in a sintering process such as that shown in FIG. 6. The furnace door may also be positioned on the sides or top of the furnace, depending on process requirements. The exhaust outlet 16 is preferably positioned near the bottom of the sintering chamber 12 in order to increase the plasma gas retention time and to increase the thermal convective turbulence.

Preferably, at least two plasma torches are utilized in connection with the furnace of the present invention to create a uniform temperature distribution. The torches should be positioned asymmetrically through injection ports in the walls of the sintering chamber to achieve a uniform temperature distribution. Asymmetric positioning of the plasma torch inlets may be achieved by locating the plasma torch inlets on opposite walls of the sintering chamber. For example, one inlet could be positioned in the upper right quadrant of the front face of the furnace sintering chamber (14) and another inlet could be positioned asymmetrically to the first inlet on the rear face (14′). Alternatively, the front face plasma gas inlet could be positioned near the top and middle and the rear face inlet could be positioned near the center and middle. If the sintering chamber is cylindrical shaped, the plasma torch inlets should be positioned on opposite sides of the chamber (180° apart), preferably with one torch inlet towards the top of the furnace, and the other towards the center. There are an unlimited number of ways to position the plasma torch inlets to achieve asymmetric positioning. Asymmetric positioning is contrasted to symmetric positioning which involves plasma torch streams coming into direct opposition; for instance, plasma torches located in the center of both the front and rear faces of the furnace sintering chamber. Preferably, the plasma torch inlet is at a perpendicular angle to the sintering chamber, if the sintering chamber is rectangular shaped, although a slight angle may serve to avoid impingement of the plasma stream on the article being sintered. For a cylindrical shaped sintering chamber, the plasma torch inlet should be positioned radially with respect to the sintering chamber. If only one plasma torch is utilized, it should be positioned near the top of the furnace to maximize the convective turbulence created by the plasma heated gases. If more than two plasma torches are utilized, at least one torch should be positioned near the top of the sintering chamber, and at least one torch should be positioned near the center of the sintering chamber.

The furnace of the invention comprises three alternative means to control the temperature of the plasma heated gases, and to thus provide appropriate sintering temperatures for refractory and ceramic articles so that they do not decompose.

Figure 3:
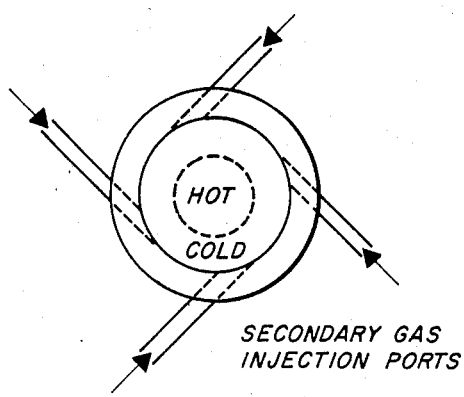
FIGS. 3 and 4 are diagrams showing the effect of tangential injection of a secondary gas into a primary hot plasma gas stream.
Figure 4:
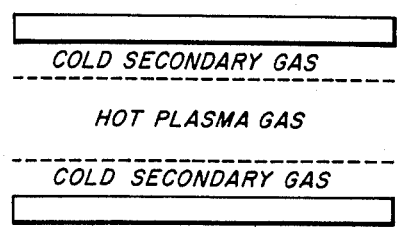

The first means of controlling the furnace temperature is disclosed in U.S. patent application Ser. No. 533,596. This means comprises tangential injection of a secondary colder gas stream into the hot primary plasma gas stream, as illustrated in FIG. 3 of the drawing, with the resulting gas stream being fired directly into the sintering chamber through the furnace injection port(s). Tangential injection of the secondary gas stream creates a swirl effect wherein the cold gas envelops the hot plasma core, as illustrated in FIG. 4. This tangential injection yields high energy efficiencies because the cold gas stream enveloping the hot plasma core stream prevents hydrodynamic interference of the secondary gas stream with the plasma arc gas stream.

Figure 5:
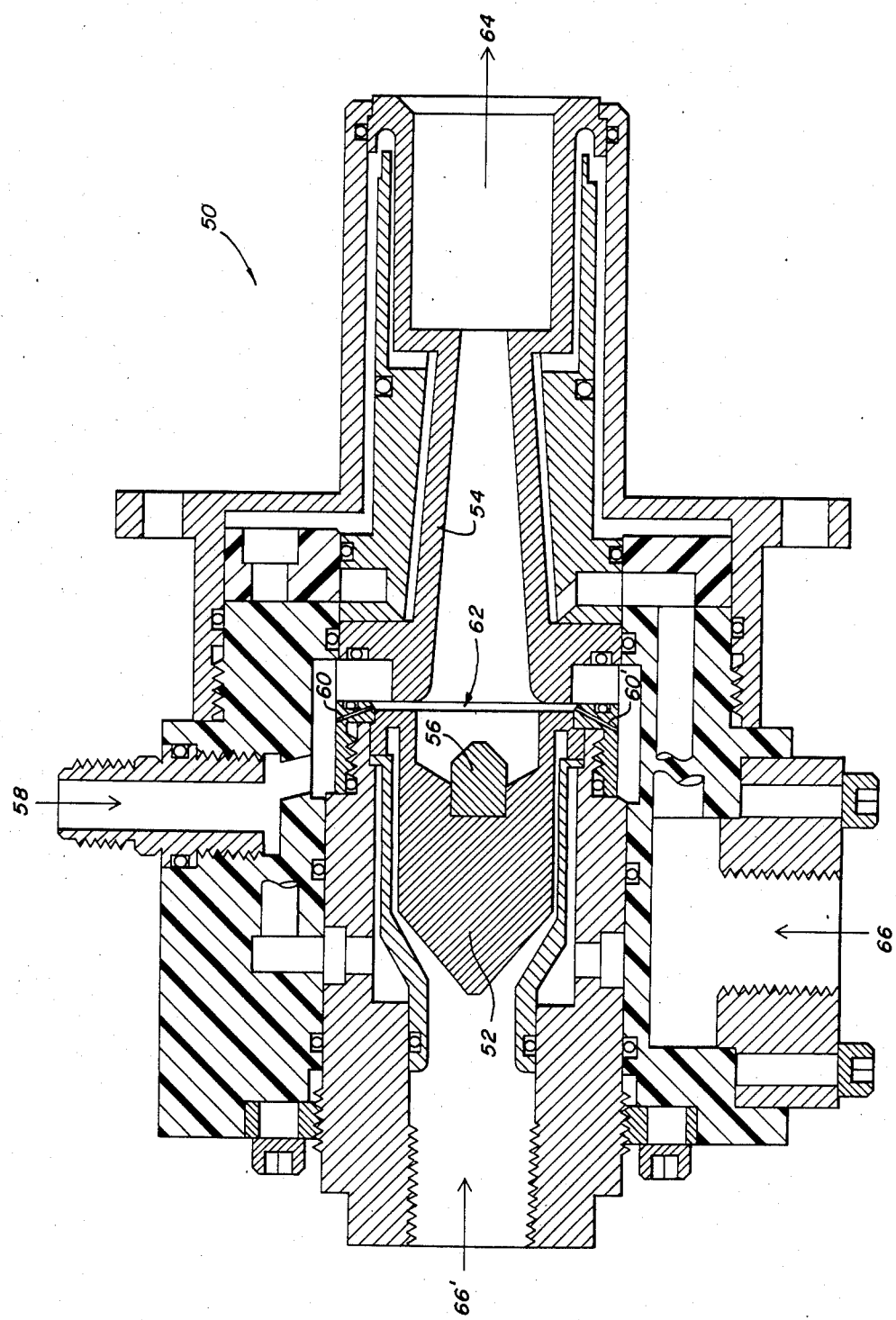
FIG. 5 is a cross-sectional side view of a plasma torch useful in connection with the furnace of the invention; and, FIG. 6 is a schematic process flowsheet showing the utilization of the furnace of the present invention in a sintering process.

Another means of controlling the furnace temperature for the sintering of ceramic and refractory materials involves the use of a plasma torch which provides very stable sintering conditions at lower plasma gas temperatures. One such plasma torch which is useful in connection with the furnace of the invention is an NTLN-80 torch manufactured by Plasma Materials, Inc. (PMI), 349 East Industrial Park Drive, Manchester, NH 03105. A cross-sectional side view of the PMI torch is shown in FIG. 5 of the drawing. The plasma torch 50 has two electrodes, a cathode 56 and an anode 54 which generate an electric arc to ionize or dissociate the plasma gas. A cathode holder 52, made from a conductive material such as copper, holds a pointed cathode tip 56 made of tungsten. The sharpness of the cathode tip 56 at a given primary gas flow rate determines the operating voltage across the electrodes. The anode 54 is also made of copper. Nitrogen, argon or other gases 58 are introduced through thirty openings 60 and 60′ (only two are pictured in FIG. 5) in a collar which surrounds the space 62 between the cathode tip 56 and anode 54 where the gas is ionized or dissociated. The plasma gas stream 64 exits the plasma torch 50 at one end 64. (The arrow shows the direction of travel.) Water 66 and 66′ is circulated through the torch 50 for cooling.

A further means of lowering and/or controlling the sintering furnace temperature is to directly introduce a colder secondary gas stream into the sintering chamber. Waste heat from the sintering process may be recirculated back into the furnace as such a secondary gas stream. Two types of secondary gas stream additions are illustrated, generally, in FIG. 6 of the drawing. This means may be utilized solely to control the furnace temperature so that decomposition of the article being sintered does not decompose, or it may be used in conjunction with the two aforementioned alternate means of (1) tangential injection of a secondary gas stream into the hot primary gas stream, or (2) use of a temperature controlled plasma torch such as the PMI torch.

FIG. 6 of the drawing is a flowsheet showing the utilization of the furnace of the present invention in a sintering process. A load of formed refractory or ceramic articles 70 is placed onto a car 72 which moves along a track system 74. The load 70' is moved along the track 74 to directly under a furnace 76. There, a lift system 78 lifts the charge 70' up into the furnace 76. The furnace 76 is closed and evacuated by a vacuum pump 80. Evacuation of the furnace is especially important for refractory or ceramic materials such as the carbides, nitrides and borides, which should be sintered in an oxygen-free environment. Suitable plasma gases for these materials include argon, nitrogen, neon, helium and hydrogen, or a combination of these gases.

After evacuation, a plasma torch 82 fires a plasma gas, such as nitrogen 84, into the furnace 76 for a sufficient time to sinter the refractory or ceramic articles. A secondary cooler gas stream 86 is useful for lowering and controlling the furnace sintering temperature.

Exhaust from the furnace leaves the furnace through an exhaust outlet 88 and is cooled in a primary gas cooler 90 and a secondary gas cooler 92. The cooled gas is then filtered 94, and sent to the building exhaust system 96 by a blower 98. The filtered exhaust stream may also be recirculated 100 back as waste heat to the furnace 76 for controlling the furnace temperature.

After sintering and cooling, the sintered load 70" is unloaded by the lift system 78 and moved down the track system 74. A typical cycle time for sintering refractory or ceramic articles using the furnace and method of the present invention is around eight hours, including loading, sintering, cooling and unloading.

The invention is further illustrated by the following non-limiting example.

EXAMPLE 1

A cylindrical shaped furnace having dimensions of about 30 inches in height and an outer diameter of around 35 inches was constructed in accordance with the invention. The sintering chamber was approximately 13 inches by 14 inches wide and 15 inches high and lined with approximately 0.5 inch of graphite. Ten layers (two inches) of graphite felt surrounded the sintering chamber. Pieces of carbon felt of 19 inches square to $26\frac{7}{8}$ inches diameter further surrounded the walls of the sintering chamber to yield a $26\frac{7}{8}$ inches diameter shape. Sixteen layers of carbon felt further surrounded the chamber to form an outer diameter of $34\frac{3}{4}$ inches. Stainless steel was used for the outer shell; a space was left between the insulation and shell for water cooling. The furnace top, bottom and door were made from graphite Fiberform ®. The furnace top was $3\frac{3}{4}$ inches high, the furnace bottom was 8 1/6 inches high at its maximum, and the furnace door was $9\frac{3}{4}$ inches high at its maximum. The furnace had two plasma torch inlets and an exhaust outlet, all lined with graphite. One of the plasma torch inlets was positioned on a side wall near the top of the sintering chamber and the other plasma torch inlet was asymmetrically positioned on the opposite wall of the sintering chamber.

Accordingly, a furnace has been discovered for the plasma sintering of ceramic or refractory materials which is energy efficient, results in high furnace productivities and superior sintered products.

Although the invention has been described with reference to its preferred embodiment, other embodiments can achieve the same results. Variations and modifications of the present invention will be obvious to those skilled in the art and it is intended to cover in the appended claims all such modifications and equivalents.

We claim:

1. A sintering furnace comprising:
   (a) a sintering chamber;
   (b) a least one first plasma torch inlet, extending through the exterior of the furnace through walls of said sintering chamber and positioned near the top of said sintering chamber;
   (c) at least one exhaust outlet below said first torch inlet and positioned near the bottom of said sintering chamber;
   (d) at least one second plasma torch inlet asymmetrically positioned to said at least one first torch inlet extending through walls of said sintering chamber facing the walls through which said at least one first torch inlet extends and positioned on that wall near the center of said sintering chamber and above said at least one exhaust outlet; and
   (e) means for controlling the plasma sintering temperature so that an article being sintered does not decompose;
   said positioning of said first torch inlet, second torch inlet, and exhaust outlet creating convective turbulence in the sintering chamber during sintering.

2. A sintering furnace in accordance with claim 1 wherein the means for controlling the plasma gas temperature during sintering comprises tangentially injecting a secondary colder gas stream into a hot primary plasma gas stream, thereby creating a swirl effect wherein the secondary gas surrounds the core of the primary plasma arc gas stream.

3. A sintering furnace in accordance with claim 1 wherein the means for controlling the plasma gas temperature during sintering comprises introducing a secondary gas stream directly into the furnace.

4. A sintering furnace in accordance with claim 3 wherein the secondary gas stream is waste heat from the sintering process.

* * * * *